United States Patent
Yu et al.

(10) Patent No.: US 8,788,374 B2
(45) Date of Patent: Jul. 22, 2014

(54) METHOD AND SYSTEM FOR ACCOUNT PARALLEL PROCESSING

(75) Inventors: Xinlin Yu, Hangzhou (CN); Fangxin Lou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/918,033

(22) PCT Filed: Jul. 14, 2010

(86) PCT No.: PCT/US2010/041905
§ 371 (c)(1),
(2), (4) Date: Aug. 17, 2010

(87) PCT Pub. No.: WO2011/016957
PCT Pub. Date: Feb. 10, 2011

(65) Prior Publication Data
US 2012/0123912 A1    May 17, 2012

(30) Foreign Application Priority Data

Aug. 7, 2009  (CN) .......................... 2009 1 0164888

(51) Int. Cl.
G07B 17/00 (2006.01)
(52) U.S. Cl.
USPC .................. 705/30; 705/35; 705/39; 705/40; 705/17; 705/21; 705/43; 705/51; 705/80; 705/37; 705/26.1; 705/5; 705/42; 705/14.23
(58) Field of Classification Search
USPC .................................................. 705/30; 3/30
See application file for complete search history.

(56) References Cited

U.S. PATENT DOCUMENTS

| | | |
|---|---|---|
| 5,940,813 A | 8/1999 | Hutchings |
| 7,379,880 B1 | 5/2008 | Pathria et al. |
| 2002/0002534 A1 | 1/2002 | Davis et al. |
| 2002/0004780 A1 | 1/2002 | Mizuta |
| 2002/0077978 A1 | 6/2002 | O'Leary et al. |
| 2002/0103752 A1 | 8/2002 | Berger et al. |
| 2002/0138426 A1 | 9/2002 | Craddick |

(Continued)

OTHER PUBLICATIONS

Keith, Mark. A Behavioral Analysis of Passphrase Design and Effectiveness. Journal of the Association for Information Systems. Feb. 2009: 63-89.*

*Primary Examiner* — Ryan Zeender
*Assistant Examiner* — Fawaad Haider
(74) *Attorney, Agent, or Firm* — Lee & Hayes, PLLC (57) ABSTRACT

A method for account parallel processing used by an account processing center to process a request for account operation is disclosed. The method comprises: (1) categorizing accounts as high parallel occurrence accounts and common accounts; (2) when receiving the request from the client for processing operation of an account, firstly determining whether the account is a high parallel occurrence account; and if the account is a high parallel occurrence account, continuing to a step (3), otherwise, conducting a step (4); (3) if the account is locked, queuing a current operation to wait until implementation of the current operation; and (4) further determining, by the account processing center, whether the account is locked and outputting an error message when the account is locked, otherwise implementing the current operation. Such method provides more high quality services to the high parallel occurrence accounts. As for the common accounts, when there is a high volume of parallel transactions on the common accounts, the volume of parallel processing can be effectively controlled by outputting an error message to prevent comment accounts from causing damage the system.

19 Claims, 4 Drawing Sheets

(56) References Cited

U.S. PATENT DOCUMENTS

| | | |
|---|---|---|
| 2003/0083989 A1 | 5/2003 | Dougall |
| 2003/0101136 A1* | 5/2003 | Wheeler et al. ............... 705/42 |
| 2004/0111346 A1 | 6/2004 | Macbeath et al. |
| 2004/0167851 A1 | 8/2004 | Knowles et al. |
| 2005/0267825 A1* | 12/2005 | Bernet et al. ............... 705/30 |
| 2007/0156556 A1 | 7/2007 | Adelson et al. |
| 2007/0192254 A1 | 8/2007 | Hinkle |
| 2007/0260496 A1 | 11/2007 | Weinstock et al. |
| 2008/0183589 A1 | 7/2008 | Dixon et al. |

* cited by examiner

METHOD AND SYSTEM FOR ACCOUNT PARALLEL PROCESSING

CROSS REFERENCE TO RELATED PATENT APPLICATIONS

This application is a national stage application of an international patent application PCT/US10/41905, filed Jul. 14, 2010, which claims priority from Chinese Patent Application No. 200910164888.1, filed Aug. 7, 2009, entitled "METHOD AND SYSTEM FOR ACCOUNT PARALLEL PROCESSING," which applications are hereby incorporated in their entirety by reference.

TECHNICAL FIELD

The present disclosure relates to internet field, and particularly relates to a system and method for account parallel processing.

BACKGROUND

Figure 1:
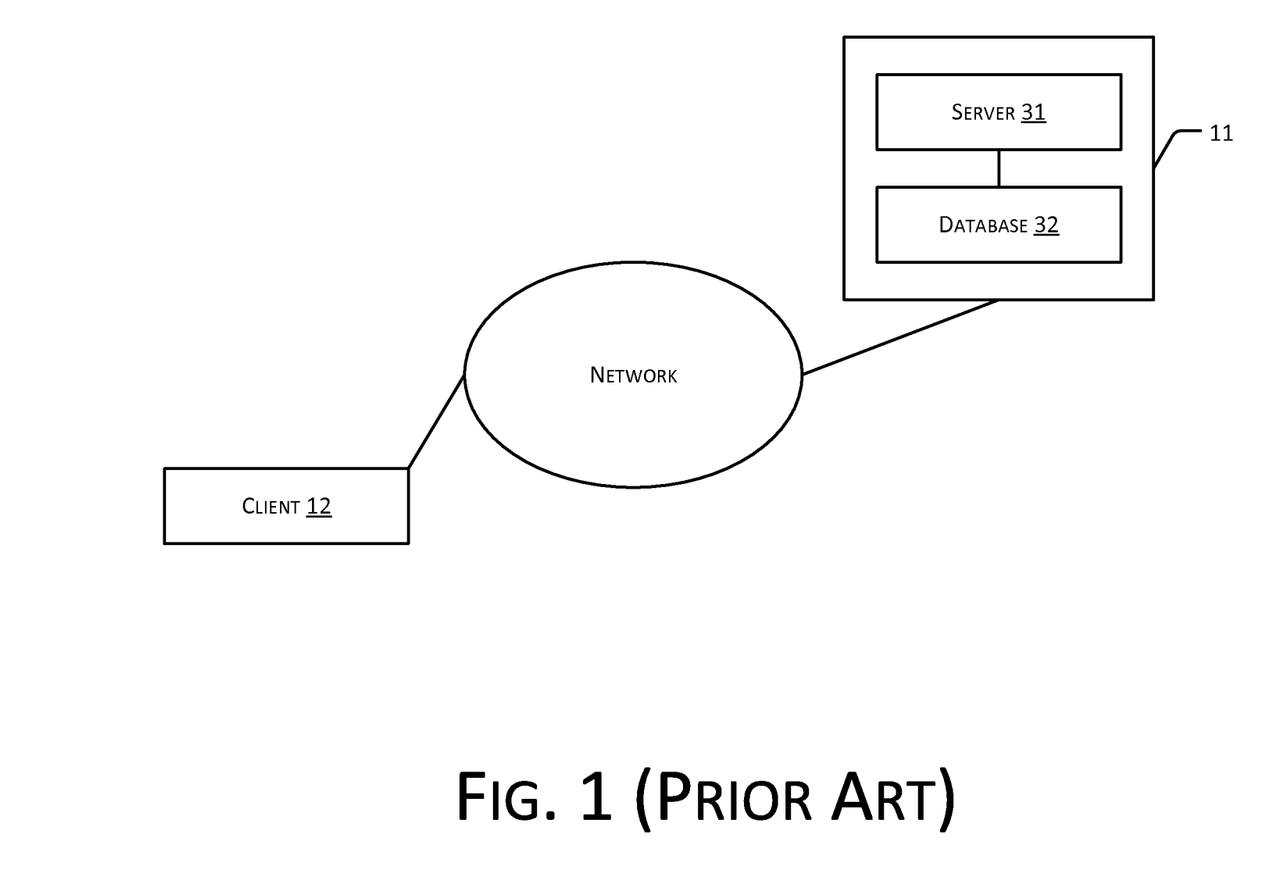
FIG. 1 shows an existing account processing system.

FIG. 1 illustrates principles of an existing account processing system. The account processing system includes an account processing center 11 and several clients 12. Account processing center 11 can reach client 12 through a dedicated line or network (internet or intranet). There can be multiple clients 12. Client 12 can be an independent terminal or an intranet composed by several terminals. Account processing center 11 includes at least a server 21 and a database 22. Database 22 is configured to store accounts information and various processing information. Server 21 is configured to conduct various operations and managements of accounts.

In an example where account processing center 11 is a third-party payment platform, when client 12 sends an instruction to account processing center 11 to pay fund in account A to several other accounts (such as account B1, B2, B3, Bn) of which payment amount is S1, S2, S3, Sn, respectively, the existing payment process is described below.

Firstly, account processing center 11 receives a request for payment operation from client 12.

Then payment account processing center 11 processes one payment operation.

Server 21 locks account A and determines whether the balance in account A is higher than amount S1. If the balance in account A is higher than S1, server 21 deducts amount S1 from the balance of account A and unlocks account A. It then locks account B1, adds amount S1 into account B1, and unlocks account B1 after completion of the payment operation.

Thus, account processing center 11 needs to perform the operation n times to complete the payment.

In other words, to prevent account parallel processing from impacting the balance in an account, there shall be only one operation affecting the account at one time. It is generally realized by locking the account, e.g., every operation on the account requires firstly determining whether the lock of the account can be obtained. If the lock can be obtained, it is assumed that there are no other operations on the same account so that the current operation can be implemented on the account. Otherwise, it is assumed that there are other operations on the same account so that a wait is required. When there are multiple waiting operations, a queue for waiting process is formed. Every operation in the queue for waiting process requires locking and unlocking of the account. The server can only serially process these operations, thus requiring lots of resources. Especially, when there are several such accounts (e.g., the accounts having a queue for waiting process) or there are a large number of operations to be processed in the queue for waiting process, collapse of the system can easily occur. Assuming the largest number of connections of the database is 100, e.g., the largest number of parallel data access is 100, when there are 100 operations in the queue for waiting process, the whole system cannot accept any new request for account operation. Thus a low efficiency of later new account operations results and collapse of the whole system will easily occur.

The existence of some unexpected events causes abnormal operation on one or more accounts. Quite commonly, an unexpected event is the sharp increase in operations on an account. This arises from a sharp increase of operations to be processed in the queue for waiting process and thereby lowers the efficiency of the whole system.

Some of the unexpected events are caused by instability or technical reasons of the system. Some are human-made. For example, each merchant has its credit rating in the online trading process. The credit rating is a representation of satisfaction of the buyer or other users regarding the service or products of the merchant. Users cannot experience the product in the context of online trading and so that the credit rating is very important for the merchant. It is called credit cheating to conduct some false trading to obtain higher credit rating. When some merchants form a group of merchant cheating, there can be frequent operations on the accounts of such merchants. It costs lots of resources of the system to process such operations and affects the normal operation on other accounts.

In other words, the existing account processing operation of the account processing center has some technical pitfalls as discussed below.

The existing payment process requires frequent operations on account A. Each operation requires locking account A and unlocking account A before and after completion of the operation, respectively. This causes not only low processing efficiency of server 21 but also a sharp reduction of processing capabilities of server 21 such that it cannot even receive processing requests sent by other clients and, if serious, collapse of server 21 may result.

Specifically, when there are relatively high amount of requests to batch process the accounts or there are many accounts to be processed in such batch processing, a high operation burden is placed on server 21. This can easily cause traffic of queue for requesting processing at server 21 and rising failure rates of processing requests, thus affecting other users' experience.

SUMMARY OF THE DISCLOSURE

A first purpose of the present disclosure is to provide a method for account parallel processing to solve the technical problem that increasing parallel operations on the same account arising from an expected event can cause low processing efficiency of the whole system.

A second purpose of the present disclosure is to provide a system for account parallel processing to solve the technical problem that increasing parallel operations on the same account arising from an expected event can cause low processing efficiency of the whole system.

A method for parallel processing of account operations by an account processing center is provided. The method may include:

(1) categorizing accounts as high parallel occurrence accounts and common accounts;

(2) when receiving a request from a client for processing an account, firstly determining whether the account is a high parallel occurrence account, and if the account is a high parallel occurrence account then proceeding to (3), otherwise, proceeding to (4);

(3) if the account is locked, queuing a current operation to wait until implementation of the current operation; and (4) further determining, by the account processing center, whether the account is locked, and outputting an error message if the account is locked, otherwise implementing the current operation.

Step (4) may also include: when the account is locked, delaying for a pre-determined period of time and then re-determining whether the current operation is implemented and, if negative, outputting the error message.

Preferably, step (1) may further include: (A1) setting up a number of Q of high parallel occurrence accounts according to a percentage of high parallel occurrence accounts in all accounts; (A2) calculating a respective number of operations of each account in a predetermined period, and ranking accounts according to their respective number of operations; (A3) using top Q accounts of highest number of operations as high parallel occurrence accounts. Further, step (1) preferably may include: saving account IDs of high parallel occurrence accounts into memory.

Step (2) also may include comparing an account ID of the account with account IDs of all high parallel occurrence accounts pre-stored in memory. In an event that there is a match, the account is the high parallel occurrence account; otherwise the account is the common account.

Implementing the current operation may further include: locking the account; implementing an operation on the account; releasing a corresponding lock of the account after the implementation of the operation.

A system for account parallel processing, including an account processing center, is provided. The account processing center may include: a high parallel occurrence account database configured to save information of all high parallel occurrence accounts; an account characterization determination unit configured to determine whether an account is a high parallel occurrence account according to the high parallel occurrence account database when receiving request for processing operation of the account; a high parallel occurrence account processing unit configured to further determine whether the account is locked, if the account is locked, to assign a current operation into a queue for waiting process to wait until implementing the current operation; otherwise, to directly implement the current operation; and a common account processing unit configured to determine whether the account is locked, and to directly output an error message and return, if the account is locked, otherwise, to implement the current operation.

The high parallel occurrence account unit may further include: a high parallel occurrence account lock determination sub-unit configured to determine whether the high parallel occurrence account is locked; and an operation implementation sub-unit configured to lock the account, to implement operation of the account, and to release a corresponding lock of the account.

The common account processing unit may further include: a common account lock determination sub-unit configured to determine whether the account is locked; a implementing operation sub-unit configured to lock the account, to implement operation of the account, and to release a corresponding lock of the account; and a lock determination sub-unit configured to receive an operation of the account after the account is locked, and to directly output an error message and return.

A method for account parallel processing used by an account processing center to process a request submitted by a client for account operation is provided. The method may include:

(1) categorizing accounts, by the account processing center, as different types of accounts, and setting up processing operations after an account is locked for each respective type of account;

(2) when receiving a request from the client for processing operation on an account, firstly determining a type of the account;

(3) further determining, by the account processing center, whether the account is locked, if the account is locked, conducting operations after the account is locked according to a processing operation flow corresponding to the type of the account, otherwise implementing a current operation.

In step (1), setting up operations after an account is locked for each respective type of account may further include:

(A1) after the account is locked, determining whether a number M is zero; if affirmative, directly returning an error message and returning; if negative, determining whether the account is locked after a waiting time T and, if the account is locked, decrementing the number M by 1 and continuing to step (A1); if the account is not locked, implementing the current operation, wherein M is a number of waiting times set up for a respective type of account, with a range between zero and infinity.

Compared with existing technologies, the present disclosure has several advantages as described below.

For a common account, it is normal to have business transactions on the account and there is usually a fixed format during a period of time. As an example of a business platform, a business volume of a common buyer in one day is limited. There cannot be too many transactions every day. In other words, there is not a high possibility of parallel transaction of the account. If a large volume of transactions in the account, they are very likely illegal transactions. However, with regards to a big seller, it is very likely that there are many parallel transactions. Many buyers buy products of the seller, which leads to many parallel transactions. According to such characteristics, the Applicant categorizes accounts into two types: high parallel occurrence accounts and common accounts. With regards to a high parallel occurrence account, when there is change of account balance, and there is a need to lock the account while the account is found to be already locked, the system will keep waiting without returning an error message. However, when there is a change of account balance in the common account, and there is a need to lock the account while the account is found to be already locked, the system will directly return an error message. Such method provides more high-quality services to the high parallel occurrence accounts. With regards to common customers, when there is a high volume of parallel transactions at the common account some day, it can effectively control the parallel occurrence volume by outputting the error and prevents such account from damaging the system.

In addition, the present disclosure also provides that when there is a request for operation of the common account and the common account is already locked, the system postpones by a predetermined amount of time and then determines whether the current operation can be implemented. If negative, the system directly outputs an error message and returns the result. Such postponed processing can lower a possible rate of wrong messages of parallel processing at the common account.

DETAILED DESCRIPTION

The follow detailed descriptions are illustrated by reference to the Figures.

Figure 2:
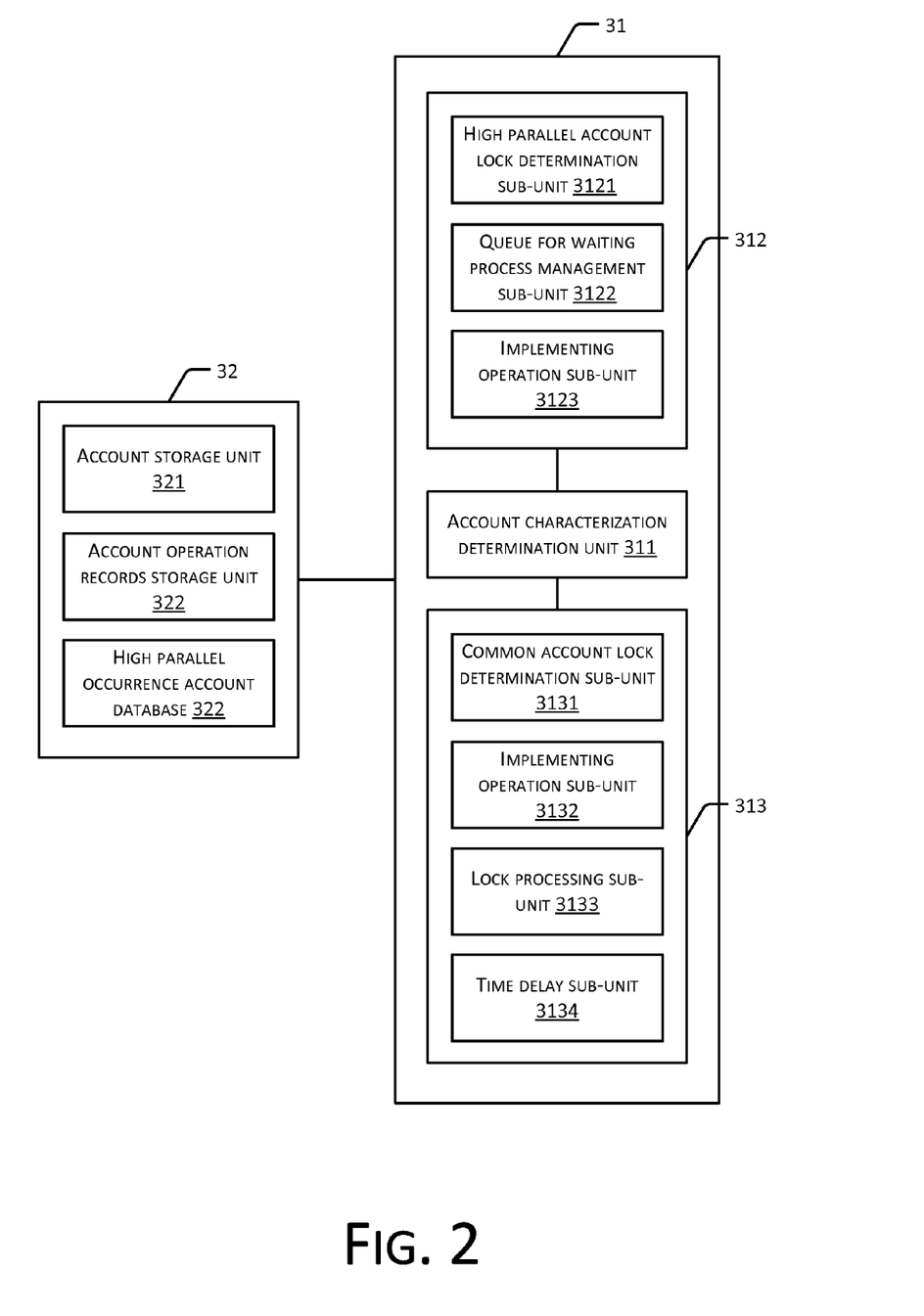
FIG. 2 shows an exemplary implementation of an account processing center in accordance with the present disclosure.

FIG. 2 illustrates an exemplary implementation of a system for account parallel processing. With reference to FIG. 1, the system of FIG. 2 includes an account processing center 11 and a client 12. Client 12 submits a request of operation to one or more accounts at account processing center 11, and accepts a returned processing result from account processing center 11.

Account processing center 11 further includes a server 31 and a database 32. Database 32 is configured to store account information and various processing information. Server 31 is configured to conduct various operations and managements of accounts. In the present disclosure, in addition to an account storage unit 321 configured to store account information and an account operation records storage unit 322 configured to store account processing operation records information, database 32 also includes a high parallel occurrence account database 323. The high parallel occurrence account database 323 is configured to store all information of high parallel occurrence accounts.

Information of a high parallel occurrence account primarily refers to an account ID that uniquely identifies the high parallel occurrence account. The present disclosure can designate the high parallel occurrence account of the account processing center 11 according to various rules. For example, an important account can be designated as the high parallel occurrence account. The account processing center 11 can also rank accounts from high to low according to a number of operations of a respective account in a period of time, and several top accounts with high volume of operations are treated as high parallel occurrence accounts.

Server 31 further includes an account characterization determination unit 311, a high parallel occurrence account processing unit 312, and a common account processing unit 313.

Account characterization determination unit 311 is configured to determine whether an account is a high parallel occurrence account according to the high parallel occurrence account database 323 after receiving a request for processing operation from the account. If affirmative, the account characterization determination unit 311 triggers the high parallel occurrence account processing unit 312. If negative, the account characterization determination unit 311 triggers the common account processing unit 313.

High parallel occurrence processing unit 312 is configured to further determine whether the account is locked. If the account is locked, the high parallel occurrence account processing unit 312 assigns a current operation to a queue for waiting process to wait until an implementation of the current operation. Otherwise, the high parallel occurrence account processing unit 312 directly implements the current operation.

The high parallel occurrence processing unit 312 further includes a high parallel occurrence account lock determination sub-unit 3121, a queue for waiting process management sub-unit 3122, and an implementing operation sub-unit 3123.

The high parallel occurrence account lock determination sub-unit 3121 is configured to determine whether the high parallel occurrence account is locked.

The queue for waiting process management sub-unit 3122 is configured to manage an operation of the queue for waiting process. The management of the operation of the queue for waiting process includes handling processes of these operations, such as first-in-first-server principle or priority principle. Some system has the management sub-unit 3122 so that a user needs not manually set up the management sub-unit.

The implementing operation sub-unit 3123 is configured to lock the account, to implement an operation on the account, and then to release a lock corresponding to the account.

The common account processing unit 313 is configured to determine whether an account is locked. If the account is locked, the common account processing unit 313 directly outputs an error message and returns. Otherwise, the common account processing unit 313 implements the current operation. Common account processing unit 313 further includes a common account lock determination sub-unit 3131, an operation implementation sub-unit 3132, and a lock processing sub-unit 3133.

The common account lock determination sub-unit 3131 is configured to determine whether the high parallel occurrence account is locked;

The operation implementation sub-unit 3132 is configured to lock the account, to implement an operation of the account, and then to release a lock corresponding to the account.

The lock processing sub-unit 3133 is configured to receive an operation of the account after the account is locked, and to accept an operation that outputs an error message and return.

In one embodiment, the common account processing unit 313 also includes a time delay sub-unit 3134. The time delay sub-unit 3134 is configured to postpone a pre-determined period of time when the account is locked, and then to re-determine whether a current operation is implemented. If negative, the time delay sub-unit 3134 directly outputs an error message and returns.

The above disclosed units only refer to logical units and are usually implemented in the form of software. However, the present disclosure does not exclude implementation in the form of hardware.

Figure 3:
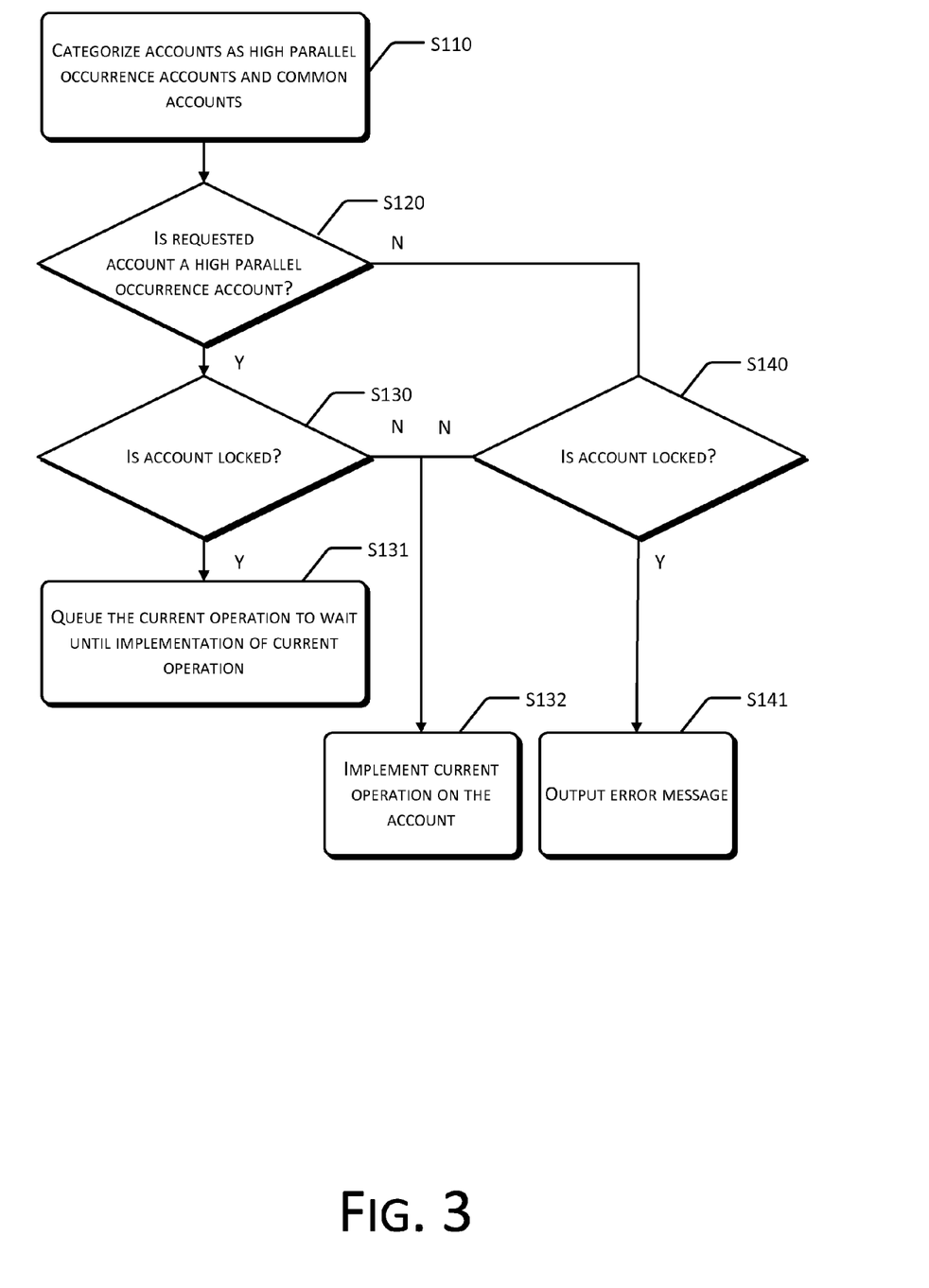
FIG. 3 shows a flowchart of a method for account parallel processing in accordance with the present disclosure.

FIG. 3 illustrates a flowchart of a method for account parallel processing, which is used to process account operations at an account processing center. The method includes several actions that are described below.

S110: categorizing accounts as high parallel occurrence accounts and common accounts. In one embodiment, there are already many existing accounts at account processing center 11. Therefore high parallel occurrence account database 323 is additionally set up to store high parallel occurrence account information. To determine whether an account is a high parallel occurrence account or a common account, a search of the high parallel occurrence account database 323 can be performed. This method does not require modifying current account information and therefore reduces the impact on stability of the current system. In another embodiment, a character attribute item of an account can be established. Each account retains the attribute of the respective account in its character attribute item indicative of the account being a high parallel occurrence account or a common account. Such approach is feasible but may not be time efficient as it requires modifying the current accounts.

The following actions can be implemented to categorize accounts into high parallel occurrence accounts and common accounts.

A1: setting up a number of Q of high parallel occurrence accounts according to a percentage of high parallel occurrence accounts among all accounts;

A2: calculating a number of operations for each account within a pre-determined period of time (such as one week for example), and ranking the accounts according to the number of operations;

A3: designating top Q accounts with high operations as high parallel occurrence accounts, and storing information of these high parallel occurrence accounts into the high parallel account database 323.

In addition, the method also periodically updates information of high parallel occurrence accounts in the high parallel occurrence account database 323 according to the number of operations. Accounts with more number of operations can be found through this method.

To increase efficiency of processing afterwards, account IDs of all high parallel occurrence accounts in the high parallel occurrence account database 323 can be saved into memory of server 31.

S120: when receiving a request for processing operation from an account, firstly determining whether the account is a high parallel occurrence account; if affirmative, proceeding to S130, otherwise, proceeding to S140.

The present disclosure uses the following steps to determine whether the account is a high parallel occurrence account.

The account ID of the account is compared with account IDs of all high parallel occurrence accounts that are pre-stored in memory or in the high parallel occurrence account database 323. If the comparison result indicates they are the same, such account is a high parallel occurrence account. Otherwise the account is a common account.

S130: determining whether the account is locked; if affirmative, assigning a current operation into a queue for waiting process to wait until implementation of the current operation (S131); if negative, implementing the current operation to the account (S132).

S140: further determining whether the account is locked; if affirmative, outputting an error message and returning (S141); otherwise implementing the current operation (S132).

The action of S130 can be realized by Oracle such as "select * from account where accountNo='XXXXX' for update."

Such coding represents performing an operation on an account of which accountNo is XXXXX. Such instruction implies "select * from account where accountNo='XXXXX' for update wait."

In other words, when the account is locked, the system waits until a time when the system is allowed to implement the operation.

The action S140 can also be realized by Java such as "select * from account where accountNo='yyyyy' for update nowait."

Such coding represents that if the account is found locked when performing an operation on the account, the system outputs an error message. The above are implementations of the present disclosure and shall not be used to limit the present disclosure. Any implementation method to realize the concepts of the present disclosure shall be within the protection scope of the present disclosure.

Implementing the current operation further includes: locking the account, implementing the operation on the account; and releasing a lock corresponding to the account after implementation of the operation.

Figure 4:
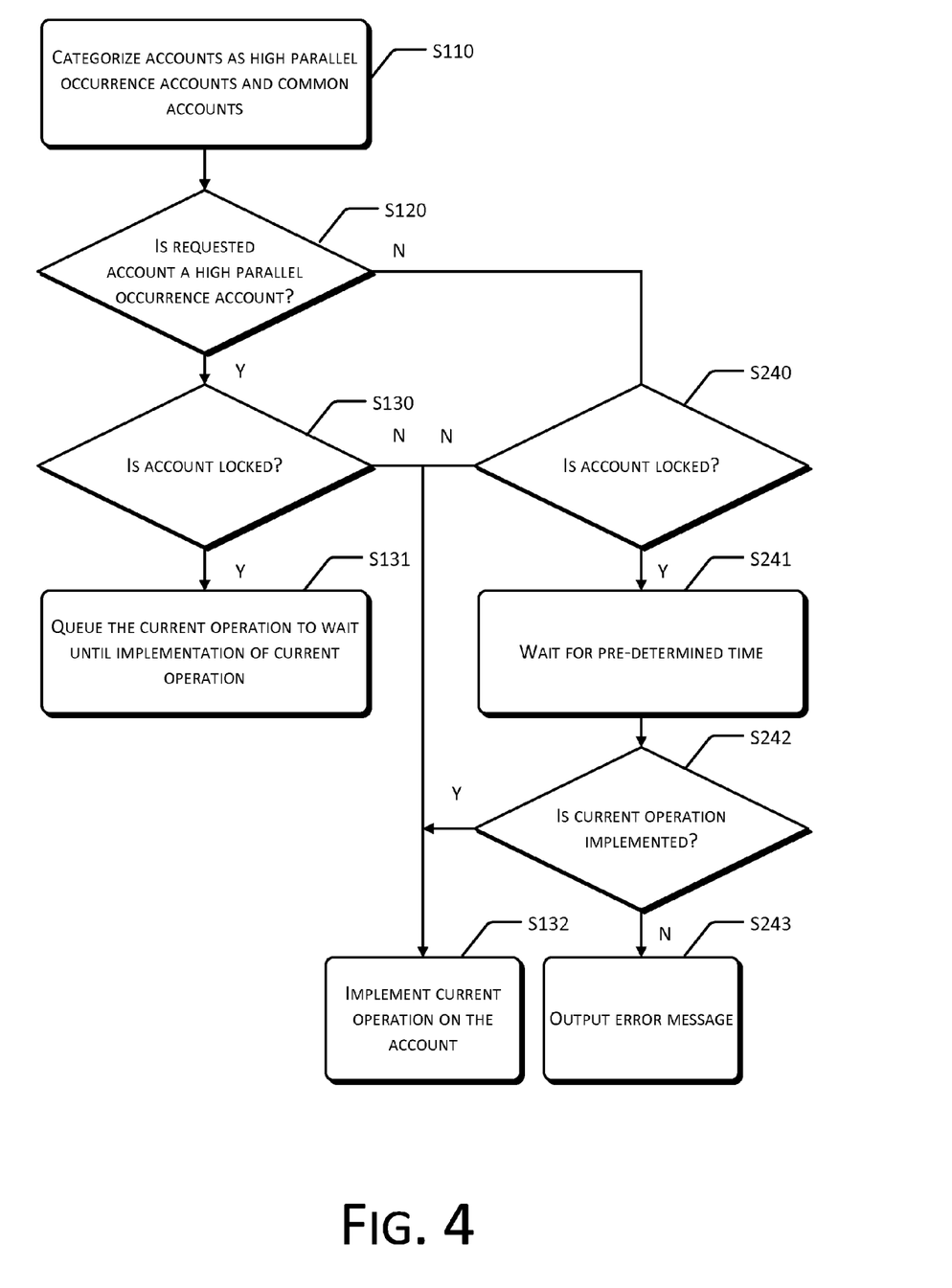
FIG. 4 shows another flowchart of a method for account parallel processing in accordance with the present disclosure.

FIG. 4 illustrates a flowchart of another method for account parallel processing.

In this embodiment, an action S240 is different from action 140 in FIG. 3. The other actions are generally similar to those in FIG. 3.

S110: categorizing accounts as high parallel occurrence accounts and common accounts.

S120: when receiving a request for processing operation from an account, firstly determining whether the account is a high parallel occurrence account; if affirmative, proceeding to S130, otherwise, proceeding to S240.

S130: determining whether the account is locked; if affirmative, assigning a current operation into a queue for waiting process to wait until implementation of the current operation (S131); if negative, implementing the current operation to the account (S132).

S240: further determining whether the account is locked; if the account is locked, after waiting for a pre-determined time (S241) further determining whether the current operation is implemented (S242); if negative, directly outputting an error message and returning (S243); if affirmative, implementing the current operation (S132); when the account is not locked, implementing the current operation (S132).

There are many methods of implementation of locking an account. For example, one common method is to set up a flag bit of the account. When the flag bit is 1, it represents that the account is locked. When the flag bit is 0, it represents that the account is not locked. Determining whether the account is locked is by determining the flag bit.

In this embodiment, when receiving a request for operation on the common account when there is an existing operation on the account, the requested operation is postponed for a pre-determined time before determining whether or not the operation is to be implemented is re-determined This can reduce a possible error reporting rate of parallel processing on the common account.

An embodiment of the present disclosure categorizes accounts as high parallel occurrence accounts and common accounts. In practice, accounts can be divided into multiple types without restriction by this embodiment of the present disclosure, such as: a first type account, a second type account, a third type account . . . , an nth type account, etc. It can be implemented by following detailed actions:

A1: setting up a number of Q1 of the first type accounts according to a percentage of the first type accounts among all accounts; setting up a number of Q2 of the second type accounts according to a percentage of the second type accounts among all accounts and so forth until setting up a number Qn of the nth type accounts.

A2: conducting statistics of a number of operations for each account within a pre-determined period of time (such as one week for example), and ranking the accounts according to the number of operations;

A3: designating the top Q1 accounts with the lowest numbers as the first type accounts, designating the next Q2 accounts as the second type accounts and so forth until obtaining information of various types of accounts and storing information of the various types of accounts in a database.

The following actions can be used to categorize accounts into multiple types:

B1: pre-setting a respective percentage of the first type accounts, the second type accounts . . . , and the nth type accounts of all the accounts;

B2: calculating a number of operations for each account within a pre-determined period of time (such as one week for example), and ranking the accounts according to the number of operations;

B3: calculating a number of the present total accounts M;

B4: calculating a respective number of each type of accounts according to the respective percentage of each type of accounts and the total accounts M;

B5: assigning the corresponding respective number of accounts to each type of accounts and saving information of such accounts into a corresponding database.

The processing concept of this embodiment is as follows: to categorize accounts into the first type accounts, the second type accounts, the third type accounts . . . , and the nth type accounts; to set up different processing strategies for the different types of accounts. For example, different types of accounts can be given different priorities. When the priority is higher, the pre-determined waiting period of time is longer when the respective account is locked.

For example, the processing strategy can be as follows: For a first type account, when the account is locked, the system directly outputs an error message and returns. For a second type account, when the account is locked, the system waits for a pre-determined time and then determines whether the account is locked; and if the account is still locked, the system outputs an error message and returns. For a third type account, when the account is locked, the system waits for a pre-determined time T and then determines whether the account is locked. If the account is still locked, then the system waits for another pre-determined time T. Afterwards, if the account is still locked, the system outputs an error message and returns. Different processing strategy can be established for different type accounts, and so on and so forth.

The accounts are categorized into different types as above. Different processing strategy is set up for each type account.

In other words, the present disclosure also provides a method for account parallel processing used by an account processing center to process a request for account operation sent by a client. The method includes the actions described below.

(1) categorizing accounts, by the account processing center, into different types of accounts, and setting up operations after an account is locked for each respective type of accounts;

(2) when receiving a request from the client for performing an operation on an account, firstly determining a type of the account;

(3) further determining, by the account processing center, whether the account is locked; if the account is locked, performing the operation after the account is unlocked according to a processing operation flow corresponding to the type of the accounts.

In action (1), setting up operations after an account is locked for each respective type accounts further includes:

A1: after the account is locked, determining whether a number M is zero, if affirmative, directly outputting an error message and returning; if negative, determining whether the account is locked after a waiting time T; if the account is still locked, decrementing the number M by 1 and proceeding to action A1; if the account is not locked, implementing the current operation, wherein:

M is a number of waiting times set up for a respective type account, a range of which can be between zero and infinity.

The above are some embodiments of the present disclosure but shall not be used to limit the present disclosure. Any foreseeable changes of the disclosed embodiments by a person of ordinary skill in the art are still within the protection scope of the present disclosure.

What is claimed is:

1. A method comprising:
   under a control of a server:
   categorizing a plurality of accounts as high parallel occurrence accounts and common accounts at least according to a number of operations of each of the plurality of accounts in a period of time;
   saving account identifications of the high parallel occurrence accounts into one or more memories;
   determining whether an account is a high parallel occurrence account upon receiving a request from a client for processing the account, the determining including:
      comparing an account identification of the account with account identifications of all high parallel occurrence accounts stored in the one or more memories; and
      when there is a match between the account identification of the account and one of the account identifications of all the high parallel occurrence accounts, determining that the account is the high parallel occurrence account, otherwise determining that the account is a common account;
   when the account is determined to be the high parallel occurrence account, queuing a current operation on the account to wait until an implementation of the current operation;
   further determining whether the account is locked;
   when the account is determined to be locked, outputting an error message; and
   when the account is determined not to be locked, implementing the current operation, the implementation of the current operation including:
      locking the account; and
      implementing an operation on the account.

2. The method as recited in claim 1, further comprising:
   when the account is determined to be locked, delaying a pre-determined period of time and then re-determining whether the current operation is implemented.

3. The method as recited in claim 1, wherein the categorizing further comprises:
   setting up a number of high parallel occurrence accounts according to a percentage of high parallel occurrence accounts among the one or more accounts.

4. The method as recited in claim 1, wherein the implementation of the current operation further comprises:
   releasing a corresponding lock of the account after the current operation is implemented.

5. A system for account parallel processing comprising:
   an account processing center, the account processing center comprising:
   a high parallel occurrence account database that stores information of one or more high parallel occurrence accounts, including identifications of the high parallel occurrence accounts, that are determined from one or more accounts based on an importance of each of the one or more accounts into one or more memories;
   an account characterization determination unit that determines whether an account is a high parallel occurrence account according to the high parallel occurrence account database when receiving a request for processing the account by:

comparing an account identification of the account with account identifications of all high parallel occurrence accounts stored in the high parallel occurrence account database; and when there is a match between the account identification of the account and one of the account identifications of all the high parallel occurrence accounts, determining that the account is the high parallel occurrence account, otherwise determining that the account is a common account;

a high parallel occurrence account processing unit that determines whether the account is locked, queues a current operation to wait until implementation of the current operation when the account is locked, and implements the current operation when the account is not locked; and a common account processing unit that determines whether the account is locked, outputs an error message when the account is locked, and implements the current operation when the account is not locked, the implementation of the current operation including:

locking the account; and implementing an operation on the account.

6. The system as recited in claim 5, wherein the high parallel occurrence account processing unit comprises:

a high parallel occurrence account lock determination sub-unit that determines whether the high parallel occurrence account is locked; and an operation implementation sub-unit that locks the account, implements one or more operations on the account, and releases a corresponding lock on the account.

7. The system as recited in claim 5, wherein the common account processing unit comprises:

a common account lock determination sub-unit that determines whether the account is locked;

an operation implementation sub-unit that locks the account, implements one or more operations on the account, and releases a corresponding lock on the account; and a lock determination sub-unit that receives an operation of the account after the account is locked, and outputs an error message.

8. The system as recited in claim 7, wherein common account processing unit further comprises:

a time delay sub-unit that postpones a pre-determined period of time when the account is locked, re-determines whether the current operation is implemented, and, if negative, outputs an error message.

9. The method as recited in claim 1, wherein categorizing accounts as high parallel occurrence accounts and common accounts comprises:

calculating a respective number of operations of each account of the one or more accounts in a predetermined period, and ranking accounts according to their respective number of operations; and designating a number of accounts with highest number of operations as the high parallel occurrence accounts.

10. The system as recited in claim 5, wherein the high parallel occurrence account database saves account identifications of high parallel occurrence accounts into memory.

11. A method comprising:

under a control of a server:

categorizing accounts into different types of accounts, the different types of accounts including high parallel occurrence accounts;

saving account identifications of the high parallel occurrence accounts into one or more memories;

establishing processing operations for accounts of each type after a respective account is locked;

determining a type of an account in response to receiving a request for processing the account from the client, the determining including:

comparing an account identification of the account with account identifications of all high parallel occurrence accounts stored in the one or more memories; and when there is a match between the account identification of the account and one of the account identifications of all the high parallel occurrence accounts, determining that the account is the high parallel occurrence account, otherwise determining that the account is a common account;

determining whether the account is locked;

when the account is locked, processing the account according to a respective processing operation corresponding to the type of the account; and when the account is not locked, implementing a current operation on the account, the implementation of the current operation including:

locking the account; and implementing an operation on the account.

12. The method as recited in claim 11, wherein establishing processing operations for accounts of each type after a respective account is locked comprises:

after the account is locked, outputting an error message when M is zero and waiting for time T before further determining if the account is locked;

when the account is further determined to be locked, decrementing M by 1, otherwise implementing the current operation, wherein:

M is a number of waiting times set up for a respective type account, and M can be a number between zero and infinity inclusively.

13. The method as recited in claim 11, wherein categorizing accounts into different types of accounts comprises categorizing accounts as high parallel occurrence accounts and common accounts.

14. The method as recited in claim 13, wherein the categorizing accounts as high parallel occurrence accounts and common accounts comprises setting up a number of high parallel occurrence accounts according to a percentage of high parallel occurrence accounts among all accounts.

15. The method as recited in claim 13, wherein the categorizing accounts as high parallel occurrence accounts and common accounts comprises:

calculating a respective number of operations of each account of the one or more accounts in a predetermined period, and ranking accounts according to their respective number of operations; and designating a number of accounts with highest number of operations as the high parallel occurrence accounts.

16. The method as recited in claim 13, wherein the categorizing accounts as high parallel occurrence accounts and common accounts comprises saving account identifications of high parallel occurrence accounts into the one or more memories.

17. The method as recited in claim 11, wherein the implementation of the current operation further comprises releasing a corresponding lock of the account after the operation is implemented.

18. The method as recited in claim 11, further comprising saving the account identification of the account into the one or more memories in response to determining that the account is the high parallel occurrence account.

19. The method as recited in claim 1, further comprising saving the account identification of the account into the one or more memories in response to determining that the account is the high parallel occurrence account.

* * * * *